US009476776B2

(12) United States Patent
Kim et al.

(10) Patent No.: US 9,476,776 B2
(45) Date of Patent: Oct. 25, 2016

(54) HOLDER REPLACING MEMBER AND HOLDER ASSEMBLY INCLUDING THE SAME

(71) Applicant: WOOJIN ELECTRO-NITE INC., Pyeongtaek-si, Gyeonggi-do (KR)

(72) Inventors: Ho-Sung Kim, Suwon-si (KR); Ki-Sun Kim, Osan-si (KR)

(73) Assignee: WOOJIN ELECTRO-NITE INC., Pyeongtaek-Si, Gyeonggi-Do (KR)

( * ) Notice: Subject to any disclaimer, the term of this patent is extended or adjusted under 35 U.S.C. 154(b) by 435 days.

(21) Appl. No.: 14/069,903

(22) Filed: Nov. 1, 2013

(65) Prior Publication Data

US 2014/0185652 A1    Jul. 3, 2014

(30) Foreign Application Priority Data

Dec. 28, 2012 (KR) .................. 10-2012-0156158

(51) Int. Cl.
  *G01K 1/14*    (2006.01)
(52) U.S. Cl.
  CPC .................. *G01K 1/14* (2013.01)
(58) Field of Classification Search
  CPC .......... G01K 7/02; G01K 1/14; G01K 13/00; G01K 13/02; G01K 1/08
  USPC ............. 374/208, 79, 163, 139, 179, 141, 1; 136/200
  See application file for complete search history.

(56) References Cited

U.S. PATENT DOCUMENTS

| 3,493,949 A | * | 2/1970 | Horning | G01K 3/14 340/524 |
| 4,220,039 A | * | 9/1980 | Taylor | G01F 1/68 374/44 |
| 4,454,370 A | * | 6/1984 | Voznick | G01K 7/04 136/221 |

(Continued)

FOREIGN PATENT DOCUMENTS

| JP | 59035867 A | 2/1984 |
| JP | 63033433 A | 2/1988 |

(Continued)

OTHER PUBLICATIONS

Japanese Office Action dated Nov. 4, 2014.

(Continued)

*Primary Examiner* — Gail Kaplan Verbitsky
(74) *Attorney, Agent, or Firm* — Hauptman Ham, LLP (57) ABSTRACT

Disclosed are a holder replacing member and a holder assembly including the same. The holder replacing member includes: a pipe-shaped conductive case; a first insulating body disposed on an inner surface of a leading end of the conductive case; a first contact pin and a second contact pin located in a hollow portion of the conductive case to be electrically connected to probes, respectively; a second insulating body electrically isolating the first contact pin, the second contact pin, and the conductive case from one another; and a female screw member coupled to an outer peripheral surface of a rear end of the conductive case to be rotated independently of the conductive case and having a female screw on an inner peripheral surface thereof.

15 Claims, 9 Drawing Sheets

(56) References Cited

U.S. PATENT DOCUMENTS

| | | | | |
|---|---|---|---|---|
| 4,842,418 | A | * | 6/1989 | Conti .................... G01K 13/125 374/139 |
| 4,863,283 | A | * | 9/1989 | Falk ........................ G01K 7/023 374/163 |
| 4,893,516 | A | | 1/1990 | Knevels |
| 5,046,857 | A | * | 9/1991 | Metzger .................... G01K 7/22 338/22 R |
| 5,088,835 | A | * | 2/1992 | Shigezawa ............. G01K 7/023 136/230 |
| 5,131,759 | A | * | 7/1992 | Eiermann ................. G01K 7/22 374/185 |
| 5,184,894 | A | * | 2/1993 | Falk ........................ G01K 1/125 136/234 |
| RE35,674 | E | * | 12/1997 | Pustell .................... G01K 13/02 136/230 |
| 5,955,684 | A | * | 9/1999 | Gravel .................. G01F 23/268 73/866.5 |
| 7,272,983 | B2 | * | 9/2007 | Caderas ................. F15B 15/261 73/866.5 |
| 7,467,891 | B2 | * | 12/2008 | Gennissen ............. G01K 13/02 374/141 |
| 8,007,170 | B2 | * | 8/2011 | Berg .................... G01D 11/245 374/184 |
| 8,162,541 | B2 | * | 4/2012 | Rose ........................ G01K 7/16 324/724 |
| 2002/0172259 | A1 | * | 11/2002 | Bach ........................ G01K 1/12 374/208 |
| 2006/0215731 | A1 | * | 9/2006 | Gadonniex .............. G01K 1/16 374/208 |
| 2010/0238973 | A1 | * | 9/2010 | Gilchrist, III ............ G01K 1/08 374/208 |
| 2012/0082181 | A1 | * | 4/2012 | Alnaqash ............... G01K 13/02 374/144 |
| 2013/0107908 | A1 | * | 5/2013 | Lukach, Jr. .............. G01K 1/16 374/208 |
| 2013/0223478 | A1 | * | 8/2013 | Landis .................... G01K 1/08 374/144 |

FOREIGN PATENT DOCUMENTS

| | | |
|---|---|---|
| JP | 63155033 A | 6/1988 |
| JP | 08338769 A | 12/1996 |
| JP | 0979914 A | 3/1997 |
| KR | 20000001626 U | 1/2000 |
| KR | 200214690 Y1 | 12/2000 |
| KR | 200270392 Y1 | 3/2002 |
| KR | 200331184 Y1 | 10/2003 |
| KR | 1020040026320 A | 3/2004 |
| KR | 1020120075708 A | 7/2012 |

OTHER PUBLICATIONS

Japanese Notice of Allowance in connection with the counterpart Japanese Application No. 2013-231758, mailed on Jun. 9, 2015.

* cited by examiner

HOLDER REPLACING MEMBER AND HOLDER ASSEMBLY INCLUDING THE SAME

CROSS-REFERENCE TO RELATED APPLICATION

This application claims priority to Korean Patent Application No. 10-2012-0156158 filed on Dec. 28, 2012, and all the benefits accruing therefrom under 35 U.S.C. §119, the contents of which is incorporated by reference in its entirety.

BACKGROUND

1. Technical Field

The present invention relates to a probe which is a sensor immersed in a molten metal to measure temperature of the molten metal, and more particularly, to a holder on which a probe is mounted.

2. Description of the Related Art

A holder on which a probe is mounted refers to a device for connecting a measuring unit to a long axis body having one end into which a probe can be inserted and mounted through a connector which can be electrically and mechanically connected to the probe and a wire extending to the other end of the connector.

Holders generally include a manual holder designed to be directly immersed in a molten metal by an operator holding a grip extending from a body thereof, and an automatic holder mounted on a separate immersion unit to be immersed into a molten metal.

One example of the automatic holder is disclosed in Korean Patent No. 10-0471626 (published on Mar. 8, 2005) entitled "Probe and Connector for Connection of Holder". One example of a manual holder is disclosed in U.S. Pat. No. 4,893,516 (published on Jan. 16, 1990) entitled "METAL CONTACT MEMBER FOR A MEASURING LANCE FOR TAKING MEASUREMENTS IN METAL MELTS".

If a holder is used for a long period of time, a connector may be contaminated by tar generated in a probe. In this case, the holder cannot be used further and must be replaced.

In order to solve this problem, in the automatic holder, a gas is blown from a lance, on which a holder is mounted, to prevent contamination of a connector. However, this configuration also has limitations, and gas purging is also limited according to measurement conditions.

Further, efforts have been made to solve this problem using a method of replacing only a tip connector of a holder instead of replacing the entirety of the holder, but it is necessary to separately connect a compensation lead wire which is an extension line in the holder and the replacing operation is very inconvenient.

Moreover, due to characteristics of the probe in which even a metal case of the holder is used as an electric connection unit according to a measurement target, part of a connector which will be replaced must be firmly mechanically and electrically coupled. However, high external pressure, vibration, and rapid change of temperature applied to the probe immersed in the molten metal provide a loose coupling state, thereby causing erroneous measurement due to unstable contact.

One example of a holder employing a conventional replacement type is disclosed in Korean Unexamined Utility Model Publication No. 20-2000-0001626 entitled "Molten Steel Temperature Measuring Apparatus".

Although a fixing pin method disclosed in this document has been used as the best method for preventing failure due to vibration, it is difficult to treat the fixing pin due to its small size upon replacement of the fixing pin and a separate tool is needed to attach and detach the fixing pin.

According to this document, although a terminal rod is configured to resiliently support an embedded terminal rod and a terminal ring, there is a very high possibility of contact instability due to vibration during measurement and it is difficult to commercialize the product due to its complex structure.

BRIEF SUMMARY

It is one aspect of the present invention to provide a holder replacing member which can be mounted on and detachably attached to a holder fixing member through simple manipulation.

It is another aspect of the present invention to provide a holder assembly including the holder replacing member.

In accordance with one aspect of the present invention, a holder replacing member is provided. The holder replacing member includes: a pipe-shaped conductive case; a first insulating body disposed on an inner surface of a leading end of the conductive case; a first contact pin and a second contact pin located in a hollow portion of the conductive case to be electrically connected to probes, respectively; a second insulating body electrically isolating the first contact pin, the second contact pin, and the conductive case from one another; and a female screw member coupled to an outer peripheral surface of a rear end of the conductive case to be rotated independently of the conductive case and having a female screw on an inner peripheral surface thereof.

In accordance with another aspect of the present invention, there is provided a holder assembly mounted at one end thereof on a probe for a molten metal and transferring an electric signal to an opposite end thereof. The holder assembly includes: a holder replacing member, a leading end of which is mounted on a probe; and a holder fixing member, a leading end of which is mechanically and electrically connected to a rear end of the holder replacing member and a rear end of which is connected to a compensation lead wire, wherein a rear end of the holder replacing member and a leading end of the holder fixing member are connected to each other by direct or indirect screw coupling.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, a holder replacing member and a holder assembly including the same according to exemplary embodiments of the present invention will be described in detail with reference to the accompanying drawings.

In the following, a leading end refers to a portion located on one side of a probe and a rear end refers to a portion located on an opposite side of the probe.

Figure 1:
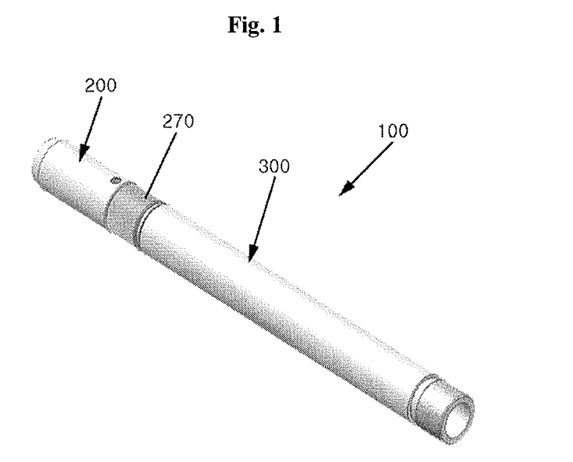
FIG. 1 is a perspective view of a holder assembly according to one embodiment of the present invention.

FIG. 1 is a perspective view of a holder assembly according to an embodiment of the present invention.

The holder assembly 100 according to the embodiment is mounted at one end thereof on a probe for a molten metal, and functions to transfer an electric signal to an opposite end thereof.

Referring to FIG. 1, the holder assembly 100 includes a holder replacing member 200 and a holder fixing member 300.

A leading end of the holder replacing member 200 is mounted on the probe.

A leading end of the holder fixing member 300 is mechanically and electrically connected to a rear end of the holder replacing member 200, and a rear end of the holder fixing member 300 is connected to a compensation lead wire 360.

The holder replacing member 200 and the holder fixing member 300 are connected to each other through direct or indirect screw coupling. The expression "direct screw coupling" means that a female screw formed on the rear end of the holder replacing member 200 is directly coupled to a male screw corresponding to the female screw and formed on a front end of the holder fixing member 300. The expression "indirect screw coupling" means that screws are formed on the rear end of the holder replacing member 200 and the front end of the holder fixing member 300, respectively, and the screws formed on the rear end of the holder replacing member 200 and the front end of the holder fixing member 300 are coupled to a separate screw member disposed therebetween.

In the holder assembly according to the embodiment, the holder replacing member 200 and the holder fixing member 300 may be easily coupled to each other through screw coupling, and in particular, in the case of the holder replacing member 200, a female screw member may be rotated independently of a conductive case, so that the holder fixing member 300 and the holder replacing member 200 can be mechanically and electrically connected to each other with ease. Further, a separate process of connecting a compensation lead wire may be omitted only by replacing the holder fixing member.

Figure 2:
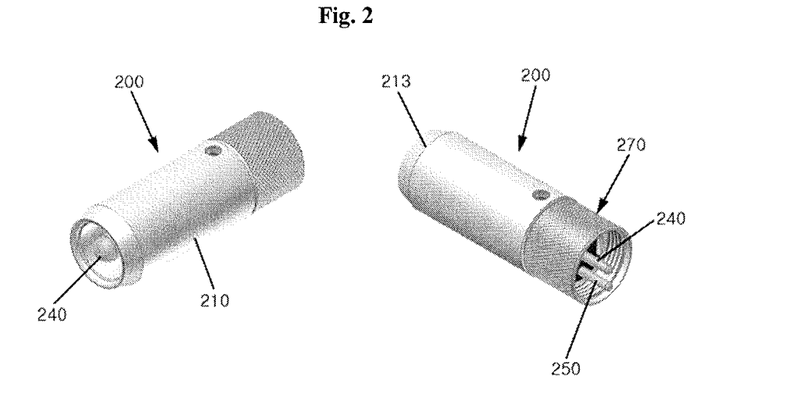
FIG. 2 is a perspective view of a holder replacing member according to one embodiment of the present invention.
Figure 3:
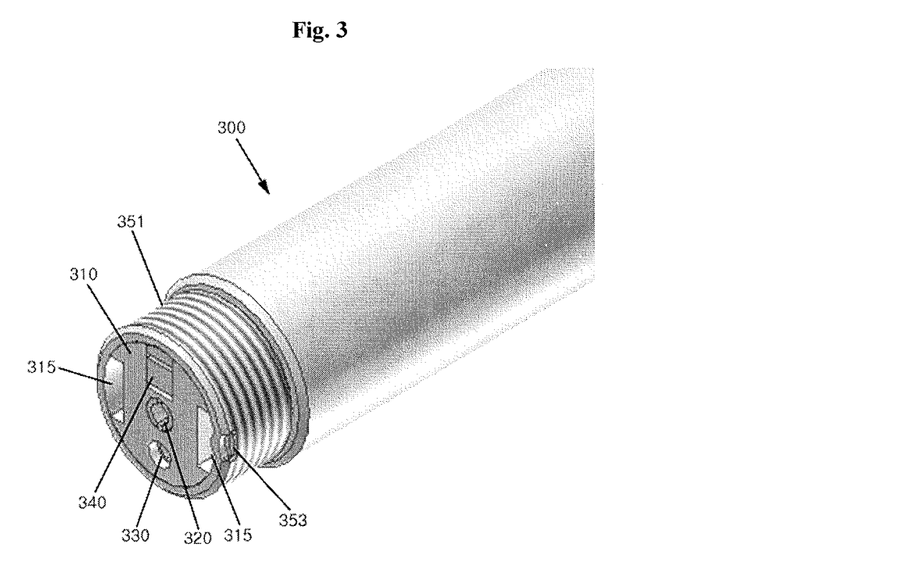
FIG. 3 is a perspective view showing main parts of a holder fixing member to which the holder replacing member of FIG. 2 is coupled.

FIG. 2 is a perspective view of a holder replacing member according to one embodiment of the present invention. FIG. 3 is a perspective view of main parts of a holder fixing member to which the holder replacing member of FIG. 2 is coupled.

Figure 4:
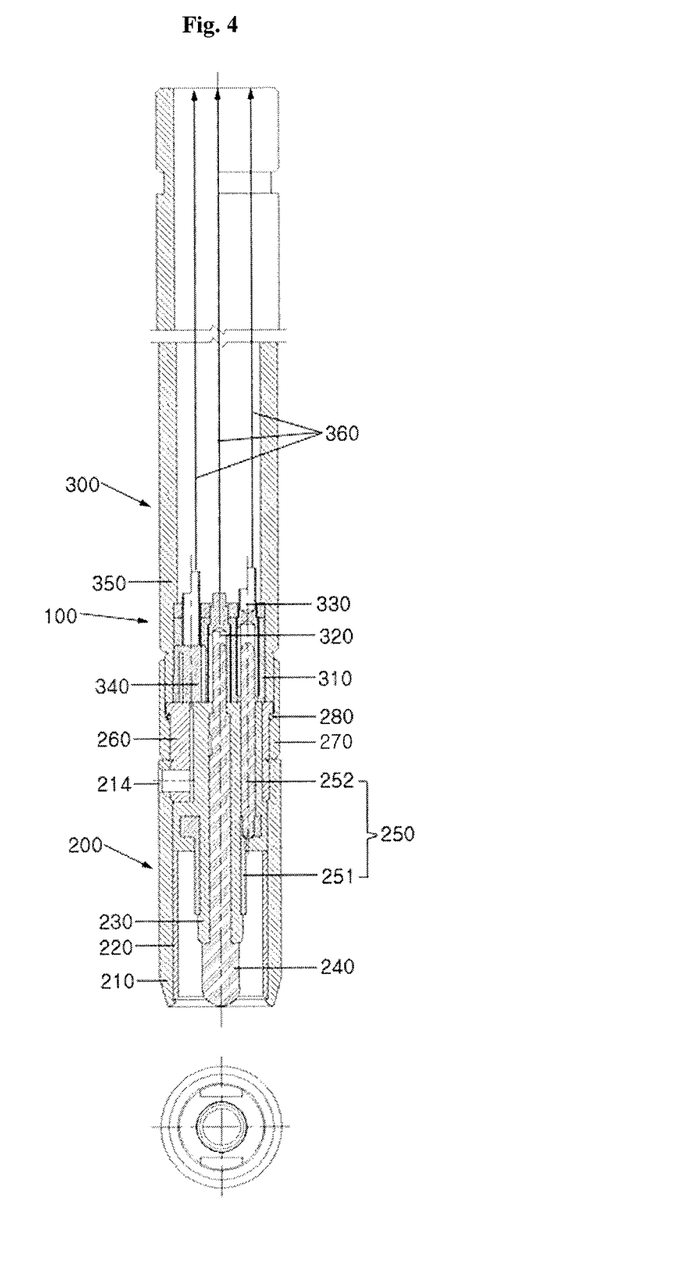
FIG. 4 is a sectional view of the holder assembly according to the embodiment.

FIG. 4 is a sectional view of the holder assembly according to the embodiment.

Referring to FIGS. 2 to 4, the holder replacing member 200 according to the embodiment includes a conductive case 210, a first insulating body 220, a first contact pin 240, a second contact pin 250, a second insulating body 230, and a female screw member 270.

The conductive case 210 forms a pipe-shape external appearance of the holder replacing member 200. The conductive case is formed of a conductive material, such as metal, and serves as a wire while being electrically connected to a compensation lead wire through a third contact body 340 of the holder fixing member.

An outer peripheral surface 213 of a leading end of the conductive case 210 in the probe mounting direction may be chamfered to facilitate mounting of the probe.

The first insulating body 220 is disposed on an inner surface of the leading end of the conductive case 210 to prevent electric current from flowing between the first contact pin 240 or the second contact pin 250 and the conductive case 210 when the probe is mounted. The first insulating body 220 may be formed in a thin film pipe shape.

The first contact pin 240 and the second contact pin 250 are located in a hollow portion in the conductive case 210 and are electrically connected to the probe.

Figure 6:
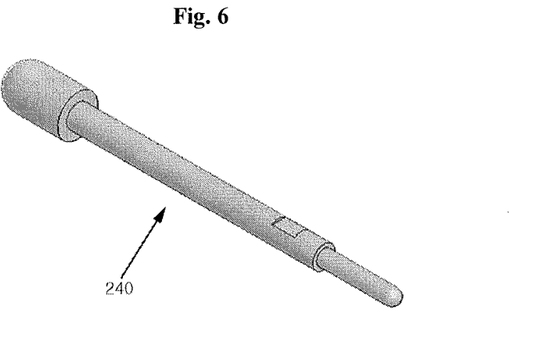
FIG. 6 shows one example of a first contact pin.

As shown in FIG. 6, a leading end and a rear end of the first contact pin 240 may be inserted into an insertion hole. The leading end of the first contact pin 240 may be inserted into the probe, and the rear end of the first contact pin 240 may be connected to the first contact body 320 through the insertion hole 313 of the holder fixing member 300.

Figure 7:
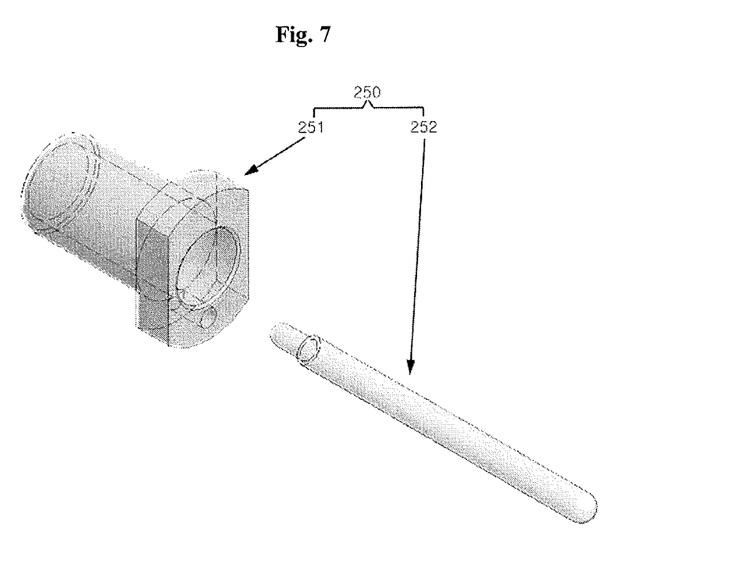
FIG. 7 shows one example of a second contact pin.

The second contact body 250 may include a contact pin connector 251, a leading end of which is exposed, and a contact pin member 252, a rear end of which is exposed. The contact pin connector 251 may surround the first contact pin 240 with the second insulating body 230 interposed therebetween. The contact pin member 252 may pass through the contact pin connector 251.

As shown in FIG. 7, the contact pin connector 251 and the contact pin member 252 may be separately formed. Through the separate configuration, the holder replacing member 200 may be easily assembled and stably maintained in a manufacturing process thereof.

The distal ends of the first contact pin 240 and the second contact pin 250 may be rounded to be easily inserted into another member.

The second insulating body 230 electrically isolates the first contact pin 240, the second contact pin 250, and the conductive case 210 from one another within the conductive case 210. The second insulating body 230 may be manufactured at once by mounting the first contact pin 240 and the second contact pin 250 on a mold, followed by rubber forming.

The female screw member 270 is independently rotatably coupled to the conductive case 210 and has a female screw on an inner peripheral surface thereof.

To allow the female screw member 270 to be independently rotatably coupled to the conductive case 210, an external step and a stepped portion may be formed at the rear end of the conductive case 210 and an internal step is formed at a leading end of the female screw member 270 so that the internal step of the female screw member 270 can be coupled to the stepped portion of the conductive case 210.

Figure 9:
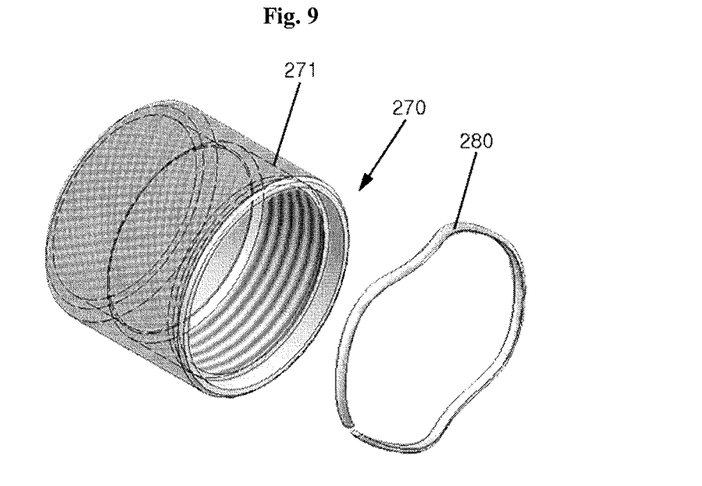
FIG. 9 shows one example of a female screw member and a seal spring.

As shown in FIGS. 4 and 9, a seal spring 280 may be further provided between the female screw member 270 and the conductive case 210. In this case, since coupling force between the female screw member 270 and the conductive case 210 or the holder fixing member 300 can be enhanced by the seal spring 280, the coupling force can withstand vibration and rapid temperature change when the temperature of a molten metal is measured, or even when the probe is attached or detached.

All of the holder replacing member 200, the holder fixing member 300, and the female screw member 270 are inserted into a protection tube of the probe. The diameters of the members may be the same or similar, which is not necessary.

Preferably, the outer diameter of the conductive case 210 of the holder replacing member 200 is the same as that of the fixing part case 350 of the holder fixing member 300 and the outer diameter of the female screw member 270 is the same as or smaller than the outer diameter of the conductive case and the outer diameter of the fixing part case. In this case, it may be suggested that the female screw member can be prevented from being rotated by external force applied to the female screw member when the female screw member is mounted, detached, and measured. Further, the female member 270 may have a rough surface 271 to facilitate rotation of the female member 270.

Referring to FIG. 4, the holder replacing member 200 further includes a third contact pin 260. The third contact pin 260 is insulated from the first contact pin 240 and the second contact pin 250 by the second insulating body 230, and contacts the conductive case 210.

Figure 8:
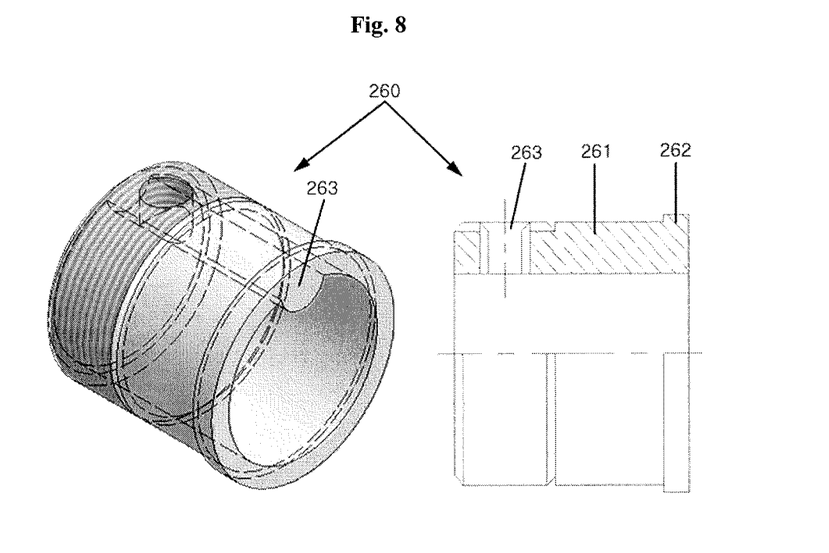
FIG. 8 shows one example of a third contact pin.

Referring to FIG. 8, the third contact pin 260 may have a pipe shape. The third contact pin 260 may have a boss 263, a section of which is expanded at a rear end thereof in the pipe thickness direction. In this case, the coupling area with the holder fixing member 300 may be widened. Rotation of the second insulating body 230 can be prevented by the boss 263.

The third contact pin 260 may have a step 261 and a stepped portion 262. In this case, the female screw member may be coupled to the third contact pin 260 and, as shown in FIG. 4, a space for disposing the seal spring 280 may be provided.

Referring to FIG. 4, fixing recesses 214 may be formed in the third contact pin 260 and the conductive case 210 so that the third contact pin 260 can be fixed to the conductive case 210.

The second insulating body 230 includes a support which contacts the conductive case 210. A purge section through which a purge gas flows may be formed inside or outside the second insulating body 230. The purge gas may include nitrogen, and the purge section may be formed using a space where a contact pin is not present.

Referring to FIGS. 3 and 4, the holder fixing member 300 includes a fixing part case 350, a first contact body 320, a second contact body 330, and a fixing part insulating body 310.

A male screw 351 corresponding to a female screw of the female screw member is formed at the leading end of the fixing part case 350.

The first contact body 320 and the second contact body 330 are formed inside the fixing part case 350. The first contact body 320 and the second contact body 330 are electrically connected to the first contact pin 240 and the second contact pin 250 of the holder replacing member 200.

Figure 11:
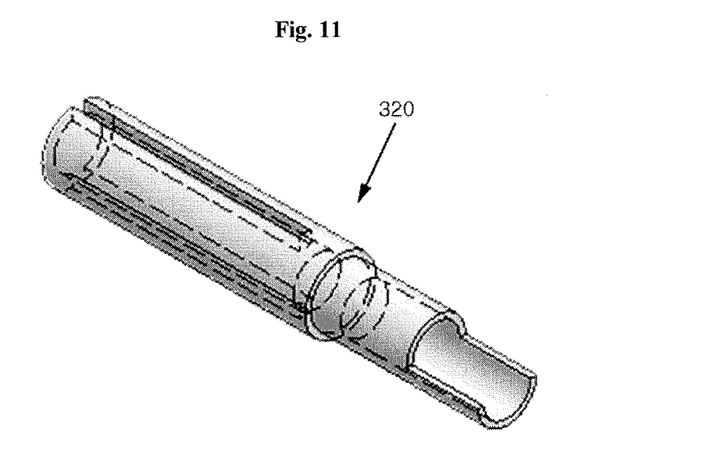
FIG. 11 shows one example of a first contact body.
Figure 12:
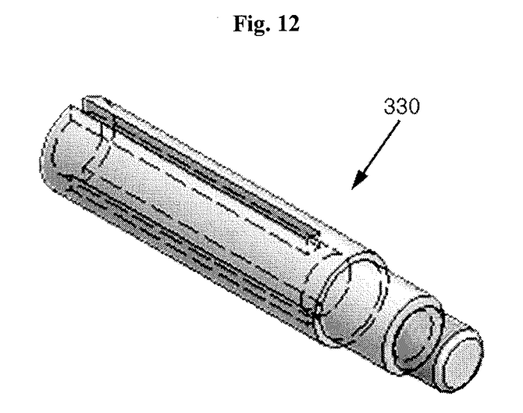
FIG. 12 shows one example of a second contact body.

Referring to FIGS. 11 and 12, the first contact body 320 and the second contact body 330 have hole shapes into which the first contact pin 240 (see FIG. 6) and the second contact pin 250 (see FIG. 7) can be inserted, and opposite sides thereof may be connected to the compensation lead wire (not shown).

The fixing part insulating body 310 electrically isolates the first contact body 320, the second contact body 330, and the fixing part case 350 from one another.

Figure 10:
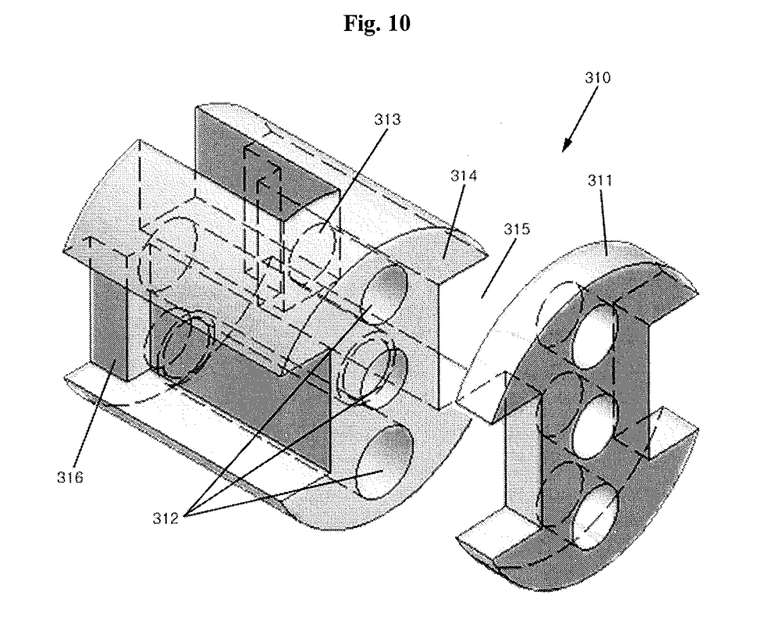
FIG. 10 shows one example of a fixing part insulating body.

The contact body 320 and the second contact body 330 may be inserted into and fixed to the fixing part insulating body 310 at the rear end thereof. As shown in FIG. 10, the fixing part insulating body 310 has a divided structure and, after the contact bodies 320 and 330 are inserted into the insertion holes 312, a separate fixing part insulating body member 311 is coupled to a rear end of the fixing part insulating body 310 to increase coupling stability.

Further, when the first contact body 320 and the second contact body 330 are fixedly inserted into the fixing part insulating body 310, a separate insertion hole may be formed in the fixing part insulating body 310. In this case, the insertion hole has a step 313 or a tapered shape to secure the first contact body 320 and the second contact body 330.

A separate internal step is formed in the fixing part case 350 to place the fixing part insulating body 310 in the fixing part case 350.

Referring to FIG. 10, a withdrawal recess 316 may be formed at the rear end of the fixing part insulating body 310.

An exchange period of the holder fixing member 200 is short, whereas an exchange period of the holder fixing member 300 is not short. Further, since the fixing part case 350 is formed of steel and is connected to a handle or an immersion unit at the rear end thereof, there may be an occasion where only the compensation lead wire 360 (see FIG. 4) connected to the fixing part insulating body 310 and the contact bodies 320, 330, 340 needs to be replaced. In this case, the fixing part insulating body 310 may be easily removed using the withdrawal recess 316 when replacing the fixing part insulating body 310.

The fixing part insulating body 310 may be withdrawn using a separate L-shaped pin or manually according to a size thereof.

In the holder fixing member, a purge section 315 through which a purge gas can flow may be formed inside or outside the fixing part insulating body 310 including the support 314, and when a purge section is formed in the holder replacing member, these purge sections may communicate with each other to allow the purge gas blown from the rear end of the holder fixing member to be delivered to the probe.

The purge section 315 of the holder fixing member 300 preferably utilizes a space having no contact body and, as shown in FIG. 10, the fixing part insulating body 310 has an I shape with a rounded head. Likewise, the second insulating body of the holder replacing member 200 may also have an I shape which has a rounded head.

The fixing part case 350 may include a rotation prevention unit for preventing rotation of the fixing part insulating body 310.

The rotation prevention unit may employ a notch 353 as shown in FIG. 3. Since the fixing part insulating body 310 may circumscribe an inner surface of the pipe-shaped fixing part case 350 upon rotation, a small notch 353 may be formed at one end of the fixing part case 350 to prevent rotation of the fixing part case 350.

Alternatively, rotation of the fixing part case 350 can be prevented by forming a separate boss (not shown) on the inner surface of the fixing part case 350, instead of using the notch 353.

The holder fixing member 300 may further include a third contact body 340. The third contact body 340 is electrically isolated from the first contact body 320 and the second contact body 330 by the fixing part insulating body 310 and may contact the fixing part case 350. Further, the third contact body 340 may be electrically connected to the third contact pin 260 of the holder replacing member 200. Unlike the first contact body 320 or the second contact body 330, the third contact body 340 may be fixedly inserted from the leading end of the fixing part insulating body 310, and effective contact with the third contact pin 260 may be secured in this manner. The third contact body 340 may have a step to improve coupling with the fixing part insulating body 310.

Figure 13:
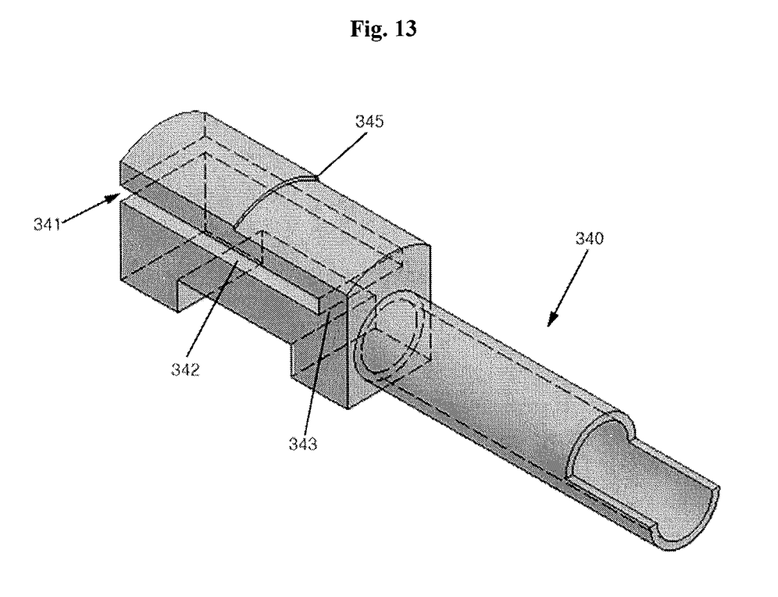
FIG. 13 shows one example of a third contact body.

Referring to FIG. 13, the third contact body 340 may further include a cutaway resilient portion 341 formed at a rear end thereof by cutting.

As shown in FIG. 13, the cutaway resilient portion 341 is formed of a resilient conductive metal to reinforce attachment of the third contact body 340 to the fixing part case, and has a cutaway portion 342 on an inner surface thereof to make an outer diameter or thickness of the cutaway portion 342 larger than that of a non-cutaway portion 343, whereby the cutaway resilient portion 341 can be slightly pressed when mounted on the fixing part case 350 and serves to enhance contact force due to restoring force of the cutaway resilient portion 341 connected to the non-cutaway portion 343 after being mounted.

The cutaway portion 342 is placed under below the cutaway resilient portion 341, and a leading end of the third contact body 340 may be the non-contact portion 343. The third contact body 340 may be attached to the fixing part case 350 by the cutaway resilient portion 341 to contact the fixing part case 350. That is, since a restoring force direction of the cutaway resilient portion 341 is a direction of the fixing part case 350, the third contact body 340 may be attached to the fixing part case 350 through the insertion hole 312 (see FIG. 10) to contact the fixing part case 350.

Figure 5:
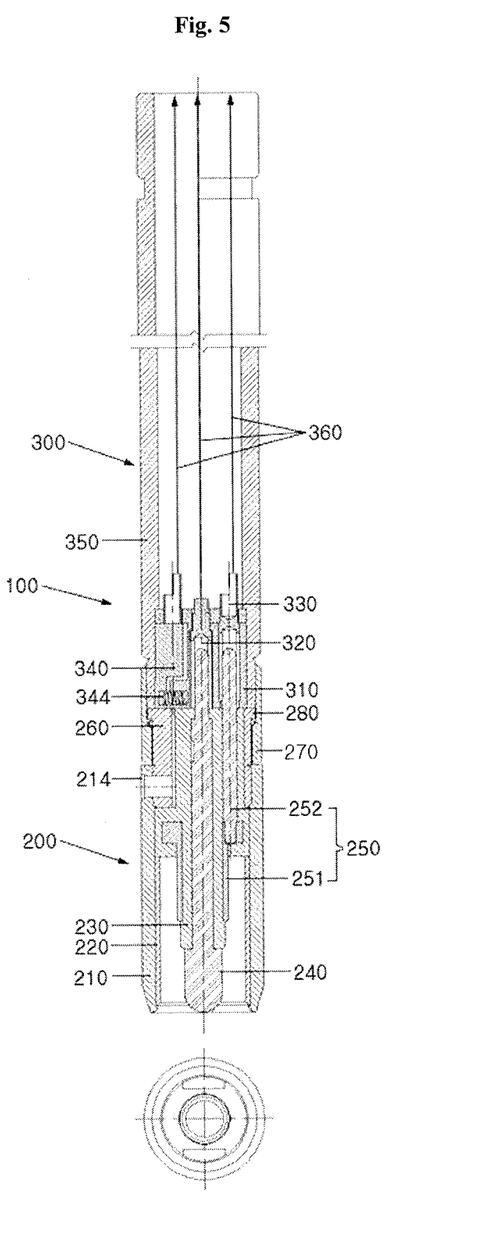
FIG. 5 is a sectional view of a holder assembly according to another embodiment of the present invention.
Figure 14:
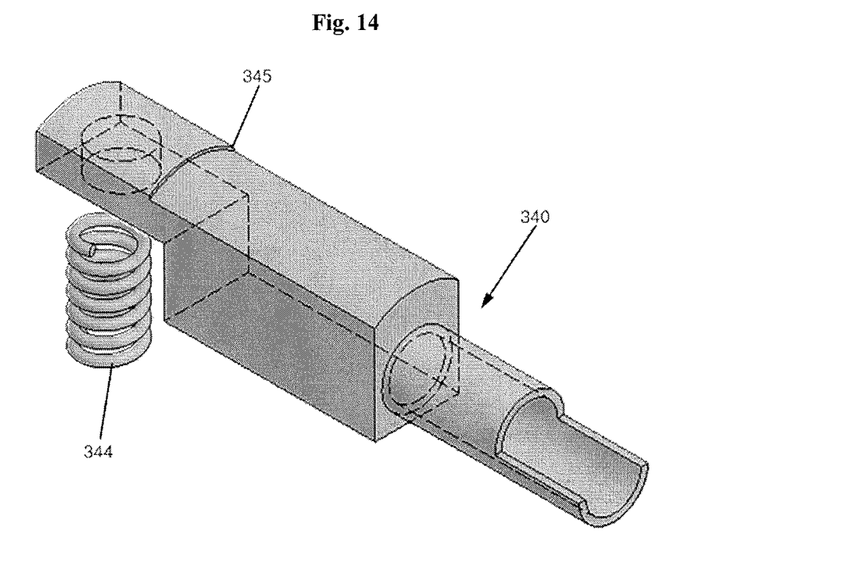
FIG. 14 shows another example of a third contact body.

Further, as shown in FIGS. 5 and 14, a third contact body 340' may be easily mounted on the fixing part case 350 by an internal spring 344, as in the cutaway resilient portion 341.

The third contact bodies 340 and 340' may be formed by forming a contact surface with the fixing part case 350 as a stepped surface or an irregular surface 345.

In order to reinforce contact force with the fixing part case 350, the contact surface with the fixing part case 350 and strong contact resilient force are required, but must not be large on a smooth surface of the pipe-shaped fixing part case 350 for convenience of assembly. In this way, to effectively perform two opposite functions, a step or another outer diameter may be present at a contact portion of the third contact body 340 with the fixing part case 350.

According to the present invention, the holder replacing member may be mechanically and electrically coupled to the holder fixing member with ease by rotating a female screw member of the holder fixing member independently of the conductive case, while the holder replacing member and the holder fixing member may be easily coupled to each other through screw coupling.

Thus, according to the present invention, since the holder fixing member can be used by replacing only the holder replacing member which needs to be replaced after a probe is immersed in a molten metal, the holder assembly may be easily formed and separate operation for connection to a compensation lead wire may be omitted.

The holder assembly according to the present invention may be an automatic holder using an automatic unit placed at a rear end of a holder fixing member, or a manual holder to which a handle is mounted, and the present invention is not limited to the embodiments and may be modified in various forms.

What is claimed is:
1. A holder replacing member comprising:
a pipe-shaped conductive case;
a first insulating body disposed on an inner surface of a leading end of the conductive case;
a first contact pin and a second contact pin located in a hollow portion of the conductive case to be electrically connected to probes, respectively;
a second insulating body electrically isolating the first contact pin, the second contact pin, and the conductive case from one another; and
a female screw member coupled to an outer peripheral surface of a rear end of the conductive case to be rotated independently of the conductive case and having a female screw on an inner peripheral surface thereof.

2. The holder replacing member according to claim 1, further comprising: a third contact pin insulated from the first contact pin and the second contact pin by the second insulating body and contacting the conductive case.

3. The holder replacing member according to claim 1, wherein the conductive case is formed at a rear end thereof with an external step and a stepped portion, the female screw member is formed at a leading end thereof with an internal step, the internal step of the screw member being coupled to the step of the conductive case.

4. The holder replacing member according to claim 3, further comprising: a seal spring disposed on the inner peripheral surface of the female screw member.

5. The holder replacing member according to claim 1, wherein the second insulating body comprises a support contacting the conductive case, and a purge section for conducting a purge gas, and the purge section is formed inside or outside the second insulating body.

6. The holder replacing member according to claim 1, wherein the second contact pin comprises a contact pin connector, a contact pin member, the contact pin connector has an exposed leading end, and the contact pin member has an exposed rear end.

7. A holder assembly mounted at one end thereof on a probe for a molten metal and transferring an electric signal to an opposite end thereof, the holder assembly comprising:
a holder replacing member, a leading end of the holder replacing member is mounted on a probe; and
a holder fixing member, a leading end of the holder fixing member is mechanically and electrically connected to a rear end of the holder replacing member, and a rear end of the holder fixing member is connected to a compensation lead wire,
wherein the rear end of the holder replacing member and the leading end of the holder fixing member are connected to each other by direct or indirect screw coupling,
the holder replacing member comprises:
a pipe-shaped conductive case;
a first insulating body disposed on an inner surface of a leading end of the conductive case;
a first contact pin and a second contact pin located in a hollow portion of the conductive case and each being electrically connected to the probe;
a second insulating body electrically isolating the first contact pin, the second contact pin, and the conductive case from one another; and
a female screw member coupled to an outer surface of the leading end of the conductive case to be rotated independently of the conductive case and having a female screw on an inner peripheral surface thereof.

8. The holder assembly according to claim 7, wherein the holder replacing member further comprises: a third contact pin insulated from the first contact pin and the second contact pin by the second insulating body and contacting the conductive case.

9. The holder assembly according to claim 7, wherein the holder fixing member comprises:
   a conductive fixing part case having a male screw at a leading end thereof;
   a first contact body and a second contact body formed inside the fixing part case; and
   a fixing part insulating body electrically isolating the first contact body, the second contact body, and the fixing part case from one another,
   wherein the first contact body and the second contact body are electrically connected to a first contact pin and a second contact pin of the holder replacing member, respectively.

10. The holder assembly according to claim 8, wherein the holder fixing member comprises:
    a conductive fixing part case having a male screw at a leading end thereof;
    a first contact body and a second contact body formed inside the fixing part case;
    a fixing part insulating body electrically isolating the first contact body, the second contact body, and the fixing part case from one another; and
    a third contact body electrically isolated from the first contact body and the second contact body by the fixing part insulating body and contacting the fixing part case,
    wherein the first contact body, the second contact body, and the third contact body are electrically connected to a first contact pin, a second contact pin, and a third contact pin of the holder replacing member, respectively.

11. The holder assembly according to claim 9, wherein the conductive case of the holder replacing member has the same outer diameter as that of the fixing part case of the holder fixing member, and the female screw member has the same or smaller outer diameter than those of the conductive case and the fixing part case.

12. The holder assembly according to claim 9, wherein the fixing part case comprises a rotation prevention unit for preventing rotation of the fixing part insulating body.

13. The holder assembly according to claim 10, wherein the conductive case of the holder replacing member has the same outer diameter as that of the fixing part case of the holder fixing member, and the female screw member has the same or smaller outer diameter than those of the conductive case and the fixing part case.

14. The holder assembly according to claim 10, wherein the fixing part case comprises a rotation prevention unit for preventing rotation of the fixing part insulating body.

15. The holder assembly according to claim 7, wherein the holder replacing member and the holder fixing member comprise purge sections for conducting a purge gas and the purge sections communicate with each other.

* * * * *